(12) United States Patent
Van Hemelryck et al.

(10) Patent No.: US 8,828,268 B2
(45) Date of Patent: Sep. 9, 2014

(54) USE OF MOLECULES HAVING ASSOCIATIVE GROUPS AS HARDENERS FOR THERMOSETTING RESINS

(71) Applicant: Arkema France, Colombes (FR)

(72) Inventors: Bruno Van Hemelryck, Chaponost (FR); Manuel Hidalgo, Brignais (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/908,581

(22) Filed: Jun. 3, 2013

(65) Prior Publication Data

US 2013/0274432 A1 Oct. 17, 2013

Related U.S. Application Data

(63) Continuation of application No. 13/375,533, filed as application No. PCT/FR2010/051095 on Jun. 4, 2010.

(30) Foreign Application Priority Data

Jun. 4, 2009 (FR) ...................................... 09 53680

(51) Int. Cl.

| C08G 59/46 | (2006.01) |
|---|---|
| C08G 65/332 | (2006.01) |
| C08G 65/333 | (2006.01) |
| C08G 65/334 | (2006.01) |
| C09K 3/00 | (2006.01) |
| C08G 59/50 | (2006.01) |
| C08G 59/32 | (2006.01) |
| C08K 5/3445 | (2006.01) |
| C08K 5/378 | (2006.01) |

(52) U.S. Cl.
CPC ...... *C08G 65/33396* (2013.01); *C08G 59/5073* (2013.01); *C08K 5/3445* (2013.01); *C08G 59/3263* (2013.01); *C08K 5/378* (2013.01)
USPC ............ 252/182.13; 252/182.17; 252/182.23; 252/182.26; 252/182.28; 528/103; 528/111; 528/113; 528/117; 528/341; 528/367; 525/420; 525/523; 548/324.5

(58) Field of Classification Search
USPC ................. 528/103, 111, 113, 117, 341, 367; 252/182.13, 182.17, 182.23, 182.26, 252/182.28; 525/420, 523; 548/324.5
See application file for complete search history.

(56) References Cited

U.S. PATENT DOCUMENTS

| 2,613,212 | A | * | 10/1952 | Hurwitz et al. ............ 548/313.7 |
|---|---|---|---|---|
| 3,563,957 | A | | 2/1971 | Beebe |
| 4,190,719 | A | * | 2/1980 | Samejima et al. ............ 528/103 |
| 5,288,873 | A | * | 2/1994 | Su et al. ...................... 548/323.5 |
| 5,422,042 | A | | 6/1995 | Waddill et al. |
| 2008/0221272 | A1 | * | 9/2008 | Tournilhac et al. ........... 525/194 |
| 2010/0305334 | A1 | * | 12/2010 | Tournilhac .................. 548/324.5 |

FOREIGN PATENT DOCUMENTS

GB 2 001 065 A 1/1979

OTHER PUBLICATIONS

International Search Report dated Oct. 6, 2010.

* cited by examiner

*Primary Examiner* — Joseph D Anthony
(74) *Attorney, Agent, or Firm* — RatnerPrestia

(57) ABSTRACT

The present invention pertains to the field of thermosetting or thermoset polymers mainly used as materials, coatings or adhesives. The invention more specifically relates to the use of specific molecules having associative groups including a nitrogen heterocycle as a hardener or co-hardener of thermosetting polymers.

9 Claims, No Drawings

USE OF MOLECULES HAVING ASSOCIATIVE GROUPS AS HARDENERS FOR THERMOSETTING RESINS

CROSS-REFERENCE TO RELATED APPLICATIONS

This application is a continuation of U.S. application Ser. No. 13/375,533, filed Dec. 14, 2011, which is a national phase application of International Application No. PCT/FR2010/051095, filed Jun. 4, 2010, which in turn claims priority from French Application No. 0953680, filed Jun. 4, 2009, each of which is incorporated herein by reference in its entirety for all purposes.

FIELD OF THE INVENTION

The present invention relates to the field of thermosetting polymers or thermosets used mainly as materials, coatings or adhesives.

The invention relates more particularly to the use of specific molecules as agents for modifying curing systems for thermosetting polymers.

BACKGROUND OF THE INVENTION

In contrast to thermoplastic polymers, which can be transformed and re-transformed using heat which, with or without a contribution of shearing mechanical energy, softens them and allows them to flow, thermosetting polymers constitute chemically crosslinked polymer networks, that is to say crosslinked by irreversible crosslinking bonds of covalent type, which, once obtained, can no longer be transformed by the action of heat. A thermosetting resin, once the polymer network has been formed, becomes a thermoset polymer network which will not flow under the effect of heat, even with a contribution of shearing mechanical energy. It is habitually said that a thermoset polymer, subjected to the effect of a constant increase in temperature, will end up by decomposing before being able to flow, as a result of the robustness of the crosslinking network formed by covalent bonds. There exists numerous systems which can result in the production of thermoset crosslinked networks involving a great variety of possible chemistries, such as, for example epoxy, polyurethane, phenol/formaldehyde, melamine/formaldehyde, silicone, urea/formaldehyde, polyester or unsaturated polyester networks. The chapter entitled "Polymer Networks" by Karel Dusek and Miroslava Duskova-Smrckova, in volume 3 of the series Macromolecular Engineering [Wiley-VCH, 2007, eds. K. Matyjaszewski, Y. Gnanou and L. Leibler], cites the main crosslinkable systems which make it possible to obtain crosslinked polymer networks.

It is customary for a person skilled in the art to consider that a thermoset polymer network is obtained by the mixing and consequent reaction of at least two components, with at least one of the two having a functionality greater than 2 with regard to the reaction involved. It is also customary for a person skilled in the art, in particular in the case of systems of epoxy or polyurethane type, to call the component carrying epoxy or isocyanate functional groups "the resin" and to call the component carrying amine or alcohol functional groups "the curing agent". Another type of language which may be encountered in this field is that which assigns the name "resin" also to the polymer network being formed or to the final polymer network. Thus, it is not uncommon to hear talk of, for example, epoxy, polyurethane or polyester resins. As regards epoxy systems in particular, it is therefore necessary to take into account the context in order to determine whether the name epoxy resin applies to the compound carrying the starting oxirane reactive functional groups (hereinafter denoted base epoxy resin) or whether it concerns the final network, after reaction with a curing agent.

The curing agent, according to this name, is thus a compound, often a polyfunctional compound, carrying reactive amine or alcohol units. It is possible to include, as a mixture with this curing agent, inter alia, compounds which are inert with regard to the reaction (such as solvents) or, on the contrary, reactive solvents or diluents which make it possible to control the reaction and to adjust certain mechanical properties of the final product, and also catalysts which make it possible to accelerate the crosslinking of the reactive components.

SUMMARY OF THE INVENTION

A subject matter of the invention is thus the use of molecules of a specific type, such as amines or alcohols carrying associated units, as partial or complete replacement for normal amine or alcohol curing agents, with the aim of forming materials, coatings or adhesives having improved properties, such as, for example a better chemical resistance, a better adhesion to supports, a better flexibility, an optimum open time or an optimum setting time.

The inventors have shown (examples 1 to 4) that these specific molecules make possible,
  excellent catalysis of the polymerization reaction, so that the use of a setting accelerator is no longer necessary,
  improved flexibility of the final resin,
  strengthening of the adhesiveness of the final epoxy resin.

A subject matter of the invention is thus the use, as curing agent for a thermosetting resin, of a molecule carrying an associative group and, preferably, of a molecule carrying an associative group of formula (I):

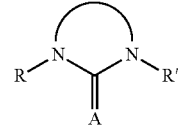

in which:
R denotes a unit comprising at least one reactive functional group, preferably an alcohol, thiol or amine functional group,
R' denotes a hydrogen atom,
A denotes an oxygen or sulfur atom, preferably an oxygen atom.

Such a use exhibits considerable advantages in comparison with normal curing agents since it makes it possible to partially or completely dispense with the use of a setting accelerator and/or of a flexibilizing agent and/or of an adhesion promoter for the final resin.

DETAILED DESCRIPTION OF THE INVENTION

Examples of the use of the various agents for modifying a thermoset resin are described in detail, for example in the work by Petrie Edward M., Epoxy Adhesives Formulations, Chemical Engineering.

Thus, it is customary for a person skilled in the art of epoxy resins to resort to a formulation which may require the incorporation simultaneously of a catalyst, of a flexibilizing agent and of an adhesion agent in the form of separate products.

A catalyst for epoxy resins is often a tertiary amine incorporated in the curing agent. The majority of the catalysts, however, are not said to promote flexibility in the final resin.

A flexibilizing agent can either be introduced with the base epoxy resin carrying oxirane functional groups or in the curing agent. It is a resin which is more flexible than the base epoxy resin or a crosslinking agent having a molecular structure which is more mobile than that of the curing agent and, in this case, it is then a cocuring agent. However, in both cases, the modifying agent has relatively high molecular weights which have the effect of increasing the distance between the crosslinking nodes by the incorporation thereof in the final polymer network, with a significant decline in the mechanical properties of the final resin. An alternative form of this method of modifying one of the main components of an epoxy resin which is targeted at giving flexibility to the finished resin is prior hybridization. It concerns modifying the stage of producing the base epoxy resin which makes it possible to produce modified base epoxy resins, such as epoxy/polyamide, epoxy/vinyl or epoxy/polysulfide resins. Some of these hybrid modifying agents improve the adhesion (case of the epoxy resins obtained between a base epoxy resin, such as a liquid resin of bisphenol A diglycidyl ether or "BADGE" type, and a polyamide), but at the expense of the thermomechanical properties. According to this principle of prior hybridization of the reactants of a two-component thermoset, other oligomeric or polymeric flexibilizing agents can be used, in a base resin or else in the curing agent, with, for example, alkyl diisocyanate prepolymers reacted with the alcohol functional groups of a base epoxy resin, or else with a silicone polymer comprising amine ends which is then employed as coreactant of the polyamine curing agent. Other polymeric coreactants or other additives have been developed in order to make possible greater flexibility of the final resin, such as liquid polybutadiene derivatives making possible the introduction of an elastic phase into the thermoset. Finally, polysulfides can be used either as flexibilizing agents or as curing agents in a standard ratio 1:1 with the base epoxy resin but, in this case, they absolutely have to be catalyzed by a tertiary amine, such as DMP-30, for example. Furthermore, their odor may require the addition of specific additives.

In addition to their high cost, all these polymers or prepolymers, modified for the purpose of being able to make possible greater flexibility of the final resin, have in common a need to profoundly modify the processing of the thermoset with respect to its original formulation when a need for flexibility is required in application. Thus, it is sometimes necessary to introduce a new type of additive into the epoxy formulation, such as a compatibilizing agent or coupling agent which makes it possible to limit the problems of phase separation and heterogeneity inside the flexibilized resin, or else it is necessary to introduce an additive which reduces the additional viscosity caused by resorting to a thermoplastic polymer component (case of epoxy-nylon resins, for example).

Another category of flexibility-promoting agents is that of the reactive or nonreactive diluents. Nonreactive diluents are formally plasticizers and not flexibilizing agents, they bring about a deterioration in the mechanical properties of epoxy resins and sometimes bring about a phenomenon of exudation, which is particularly undesirable for adhesives.

The reactive diluents are non-migrating as they participate in the formation of the polymer network. They are often long-chain molecules comprising a monoglycidyl functionality but reactive diluents comprising a diglycidyl functionality can contribute to the density of the final thermoset network without, however, improving the adhesion. They are conventionally combined with the base epoxy component of the resin due to their compatibility.

Among the agents which promote the adhesion of thermosets, organosilanes constitute a widely used family which are good promoters of adhesion between the crosslinked epoxy resin and an inorganic support carrying surface hydroxyl functional groups, for example, an inorganic filler (such as a clay or alumina), a composite reinforcing glass fiber or a ceramic. Organosilanes are also used to increase the adhesion of the epoxy resin to a metal support. They can be employed as primer coating directly on the support or else can be incorporated in the formulating of the thermoset. However, as the use in adhesion on metals is optimum when the organosilane is applied as primer layer on the metal support, this implies, in this case, a stage of pretreatment before the deposition of the thermoset. However, organosilanes exhibit a sensitivity to moisture which can make their use problematic and their effectiveness uncertain. Furthermore, the use thereof on a polymer support requires the latter to have, at its surface, free reactive groups capable of reacting with the silanes, typically OH groups, with the result that applications involving organosilanes relate in particular to the preparation of composites for which it is desired to increase the mechanical strength properties and the durability by a coupling between the thermoset organic binder and the inorganic or metal reinforcement.

Another type of agent which promotes the adhesion of the epoxy polymer organic matrix to an inorganic support is that of organometallic complexes (titanate or zirconate for example). However, these complexes are problematic to apply due to the high risk of overdosage, their optimum effectiveness being obtained for the amount which provides for the formation of a single layer at the surface of the support. The use thereof is thus instead reserved for the surface treatment of inorganic fillers, in order to facilitate the dispersion thereof in the organic matrix. The role is then that of a coupling agent between inorganic filler and resin, which does not contribute to improving the adhesion between thermoset resin and an inorganic or metal support. Other organometallic complexes based on chromium or on cobalt have been studied but are of limited use due to their toxicity.

According to the invention, the use, as curing agent for a thermosetting resin, of a molecule carrying an associative group as defined above thus makes it possible to accelerate the setting of a two-component thermoset resin and to contribute flexibility without, however, seriously damaging the mechanical properties of the final resin. The use according to the invention also makes it possible to reinforce the adhesion of the resin on not only inorganic or metal supports but also polymers not carrying hydroxyl functional groups, such as PMMA, for example. The latter situation of adhesion between thermoset resin and polymer is illustrated by the possibility of obtaining, according to the invention, adhesion between polymers of different natures, as in the case, for example, of the deposition of a layer of thermoset of polyurethane type on an epoxy thermoset underlayer.

In a preferred embodiment of the invention, the molecule carrying an associative group comprising a nitrogenous heterocycle is used as curing agent for at least two thermosetting resins which are preferably different.

This embodiment is particularly advantageous since it makes it possible to increase the adhesion between two resins while dispensing with the use of an adhesive which exhibits the possible disadvantage of evaporation of solvent.

This embodiment also makes it possible to dispense with the use of a thermosetting resin partially modified by a reactant, which resin is subsequently reacted with another resin.

This is because this second processing stage can be difficult if it requires activation by heating, or else presents problems for the environment if the reaction has to be carried out at ambient temperature but while employing the chemistry of highly reactive groups, such as isocyanates, which can be harmful to the health, on the processing site.

As an example of the present invention and as regards more particularly thermosetting resins comprising epoxy functional groups, the endemic defects of these epoxy resins, which are the excessive stiffness and their lack of adhesion, are for the first time improved by the same modifying agent, in the form of a molecule carrying an associative group. To date, modifying the flexibility of the finished epoxy resin was obtained either by modifying the base pre-resin or resin carrying epoxy functional groups or by addition of reactive solvent, such as a fatty monoepoxide. For its part, the adhesion of the finished epoxy resin was improved by the addition of adhesion-promoting agents of silylated type, for example, with the result that the two properties, stiffness and adhesion, involve significant modifications to the polymer network and complicated the processing thereof in terms of formulating.

The term "curing agent" is understood to mean, within the meaning of the present invention, a compound capable of bringing about chemical crosslinking of a polymer network via irreversible crosslinking bonds of covalent type which, once they have been obtained, can no longer be transformed by the action of heat.

The associated units according to the invention are units comprising nitrogenous heterocycles which are capable of creating, between units of at least two different molecules, complementary physical bonds of hydrogen bond type.

The term "associative groups" is understood to mean groups capable of associating with one another via hydrogen, ionic and/or hydrophobic bonds. They are, according to a preferred form of the invention, groups capable of associating via hydrogen bonds, comprising a nitrogenous heterocycle, preferably a dinitrogenous heterocycle, generally having 5 or 6 ring members, and preferably comprising a carbonyl group. Examples of associative groups which can be used according to this preferred form of the invention are imidazolidinyl, bis-ureyl, ureido-pyrimidyl groups. The imidazolidinyl group is preferred.

In a preferred embodiment, these molecules carrying associative groups are used in combination with normal curing agents of amine or alcohol type, which makes it possible to adjust the properties of the thermoset resins obtained, such as the adhesion to supports and the flexibility.

Thus, in a preferred embodiment of the invention, the use of a molecule carrying an associative group comprising a nitrogenous heterocycle takes place in combination with a cocuring agent, that is to say a normal curing agent, in order to increase the adhesion of said resin to a support.

As is presented in example 4, the use of such a molecule carrying an associative group in combination with a cocuring agent makes it possible to increase the adhesion to the support of a thermosetting resin in comparison with a resin which does not comprise this type of molecule carrying an associative group. Preferably, in the molecule carrying an associative group of formula (I) R is chosen from $H_2N—(CH_2)_n—$, $HS—(CH_2)_n—$ or $HO—(CH_2)_n—$, where n represents an integer between 1 and 18.

In particular, the molecules carrying associative groups comprising, in addition to a nitrogenous heterocycle, at least one amine or alcohol functional group are particularly preferred. Furthermore, when these molecules exhibit a water-soluble nature, which is the case in particular when, in the above formulae, n is equal to 1 or 2, in the $H_2N—(CH_2)_n—$, $HS—(CH_2)_n—$ or $HO—(CH_2)_n—$ units, this makes it possible to use them as curing agent for thermosetting resins in water or in an aqueous emulsion. This embodiment is of great industrial and commercial interest for the preparation, in particular, of aqueous-based coatings and adhesives.

Another subject matter of the invention is thus the use of a molecule of formula (I), characterized in that n is equal to 1 or 2, and in that the thermosetting resin is present in water or in an aqueous emulsion.

Thus, said molecule carrying an associative group is preferably chosen from: 1-(2-aminoethyl)imidazolidone, also known as 1-(2-aminoethyl)imidazolidin-2-one (UDETA), 1-(2-hydroxyethyl)imidazolidone (HEIO), 1-(2-[(2-aminoethyl)amino]ethyl)imidazolidone (UTETA), 1-(2-[2-{2-aminoethylamino}ethylamino]ethyl)imidazolidone (UTEPA) or N-(6-aminohexyl)-N'-(6-methyl-4-oxo-1,4-dihydropyrimidin-2-yl)urea (UPy).

The compounds UDETA, UTETA and UTEPA can be obtained by reaction of urea with a polyamine. For example, UDETA, UTETA and UTEPA can be respectively prepared by reacting urea with diethylenetriamine (DETA), triethylenetetramine (TETA) and tetraethylenepentamine (TEPA). The compound HEIO can be obtained by reaction of urea with the corresponding diaminoalcohol, namely 2-[(2-aminoethyl)amino]ethanol.

As indicated above, although the molecules carrying associative groups can be used alone as curing agents for thermosetting resin, these molecules are preferably used as a mixture with other curing agents.

Thus, in the case where these molecules carrying associative groups are used in combination with normal curing agents, they are used at a content of 0.1 to 50% by weight, with respect to the total weight of the combination.

Mention may be made, among the compounds which may be used as normal curing agents or as cocuring agents according to the invention, of:

- alkyl- or arylamines and in particular linear ethylene polyamines, such as ethylenediamine, diethylenetriamine (DETA), triethylenetetramine (TETA) and tetraethylenepentamine (TEPA), cyclic diamines, in particular 1-2-diaminocyclohexane, isophoronediamine or N,N'-diisopropylisophoronediamine, aromatic primary diamines, such as 4,4'-methylenedianiline, 4,4'-methylenebis(ortho-chloroaniline) (or MBOCA), xylenediamine isomers, such as diethyltoluenediamine (or DETDA),
- adducts of ethylene oxide or propylene oxide with a polyamine, such as DETA, for example, hydroxyethyldiethylenetriamine, the polyetheramines sold by Huntsman, under the trade name Jeffamine® D-2000, T-403,
- BADGE-aliphatic amine adducts with an excess of amine functional groups relative to the glycidyls,
- polyamidoamines, for example Versamid® 140 from Cognis Corp. or Epikure® 3090 from Hexion,
- polyamides, such as Epi-cure® 3090 and Epikure® 3100-ET-60 from Hexion,
- the amidoamines obtained by condensation between a fatty acid and a polyamine, such as Ancamide®-260A® and Ancamide® 501 from Air Products,
- "flexibilized" polyamides such as Epi-cure® 3164 from Hexion,
- polymercaptans such as Capcure® 3830-81, from Cognis Corp.,
- the Mannich bases obtained by reaction between (poly) amine, formaldehyde and (alkyl)phenols, such as Epi-cure® 190, 195, 197 from Hexion, ketimines for example Epikure® 3502 from Hexion,
the dicyanodiamide (DICY) Amicure® CG-1200 from Air Products,
base polyol epoxy resins making crosslink polyisocyanates, for example, Epikote® 1007 and 1009 from Hexion, and
polyurethane-curing polyols and polyol esters.

In one embodiment of the invention, the molecule carrying an associative group according to the invention can be used in combination with a setting-accelerating agent and/or a flexibilizing agent and/or an adhesion promoting agent or even in combination with another molecule carrying an associative group. It is thus possible to envisage, for example, the use of UDETA and HEIO as curing agent or cocuring agent for a polyurethane/polyurea resin.

The epoxy or polyurethane setting accelerator can be a tertiary amine, such as the Jeffcat® catalyst for polyurethanes from Huntsman, a phenol, such as Epikure® 3253 from Huntsman, Lewis acids for catalyzing the reaction with the epoxy oxiranes or 2-ethyl-4-methylimidazole (EMI).

The flexibilizing agent can be a difunctional resin which is more flexible than the base resin and can then be employed alone or in co-crosslinking with the normal curing agent or else the flexibilizing agent can be found among long-chain molecules comprising a monoglycidyl functionality or sometimes a diglycidyl functionality (in the case of epoxy resins).

The adhesion-promoting agent can be chosen from an organosilane, an organometallic complex of titanate or zirconate type and more generally from the abovementioned compounds.

Other additives can be used in combination with the molecules according to the invention. They are, for example, solvents or diluents, which are or are not reactive, catalysts for the crosslinking reaction and monofunctional compounds other than the molecules carrying associative groups according to the invention. Mention may be made, among the non-reactive solvents of Epodil® 748 from Air Products, mention may be made, among non-reactive additives of dibutyl phthalate, coal pitch, or pine oil, mention may be made, among reactive diluents for epoxy resins, of glycidyl alkyl ethers, styrene oxide or butanediol diglycidyl ether, mention may be made from among crosslinking catalysts, of dicyanodiamide (DICY) (e.g. Amicure CG-1200 from Air Products), tertiary amines, such as Epikure® 3253 from Huntsman, or all the tertiary amines of the Jeffcat® range from Huntsman, mention may be made among the fillers particularly valued in the context of the invention, of talc, calcined silica, alumina, silicates, clays, calcium carbonate, aluminum trioxide as flame retardant, metal powders or carbon nanotubes as thermally or electrically conducting agent.

The term "thermosetting resin" is understood to mean, within the meaning of the present invention, a polymer which can be crosslinked chemically by a curing agent to give a thermoset resin which, once obtained, can no longer be transformed by the action of heat. In other words, the thermosetting resin, once the polymer network has been formed, becomes a thermoset polymer network which will not flow under the effect of heat, even with a contribution of shearing mechanical energy.

Preference is given, among thermosetting resins to those comprising epoxy, isocyanate or acid units, such as those which result in the production of thermoset networks of epoxy, polyurethane or polyester type by reaction with the molecule carrying associative groups carrying, in addition to a nitrogenous heterocycle, an amine or alcohol functional group.

As regards the epoxy resins to be crosslinked using the curing agent according to the invention, mention may be made, by way of example, of epoxidized resins exhibiting a functionality, defined as the number of epoxide functional groups per molecule, at least equal to 2, such as bisphenol A diglycidyl ether, butadiene diepoxide, 3,4-epoxycyclohexylmethyl 3,4-epoxycyclohexanecarboxylate, vinylcyclohexene dioxide, 4,4'-di(1,2-epoxyethyl)diphenyl ether, 4,4'-di(1,2-epoxyethyl)biphenyl, 2,2-bis(3,4-epoxy-cyclohexyl)propane, resorcinol diglycidyl ether, phloroglucinol diglycidyl ether, bis(2,3-epoxycyclopentyl)ether, 2-(3,4-epoxy)cyclohexyl-5,5-spiro(3,5-epoxy)cyclohexane-m-dioxane, bis(3,4-epoxy-6-methylcyclohexyl)adipate, N,N'-m-phenylenebis(4,5-epoxy-1,2-cyclohexane-dicarboxamide), a diepoxy compound comprising a hydantoin ring and the like. Such resins can be generally represented by the formula (II):

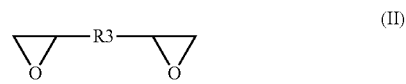

in which R3 is a group of formula —CH$_2$—O—R4-O—CH$_2$— in which R4 is a divalent group chosen from alkylene groups having from 2 to 12 carbon atoms and also comprising at least one substituted or unsubstituted aliphatic or aromatic ring. Use may also be made of polyepoxidized resins comprising three or more epoxide groups per molecule, such as, for example, p-aminophenol triglycidyl ether, polyaryl glycidyl ethers, 1,3,5-tri(1,2-epoxy)benzene, 2,2',4,4'-tetraglycidoxybenzophenone, tetraglycidoxytetraphenyle-thane, the polyglycidyl ether of the phenol/formaldehyde resin of novolac type, glycerol triglycidyl ether, trimethylolpropane triglycidyl ether and tetraglycidyl-4,4'-diaminodiphenylmethane.

As regards the isocyanate resins to be crosslinked according to the invention, mention may be made of hexamethylene diisocyanate (HMDI), trimethylhexamethylene diisocyanates (TMDIs), such as 2,2,4-trimethylhexamethylene diisocyanate and 2,4,4-trimethylhexamethylene diisocyanate, undecane triisocyanates (UNTIs), 2-methylpentane diisocyanate, isophorone diisocyanate, norbornane diisocyanate (NBDI), 1,3-bis(isocyanatomethyl)cyclohexane (hydrogenated XDI), bis(4-isocyanatocyclohexyl)methane (H12MDI), 2,4- or 2,6-toluene diisocyanate (TDI), diphenylmethane diisocyanates (MDIs), 1,5-naphthalene diisocyanate (NDI), p-phenylene diisocyanate (PPDI), adducts comprising at least two isocyanate functional groups and formed by condensation between compounds comprising at least two isocyanate functional groups among those mentioned and compounds carrying other functional groups which react with the isocyanate functional groups, such as, for example, hydroxyl, thiol or amine functional groups.

Mention may be made, among polyisocyanates, of modified polyisocyanates, such as those comprising carbodiimide groups, urethane groups, isocyanurate groups, urea groups or biurea groups.

As regards the polyols which make it possible to crosslink the polyisocyanates in order to obtain polyurethanes and in which the molecule carrying an associative functional group according to the invention, such as HEIO, can be directly incorporated, mention may be made in particular of glycerol, ethylene glycol, trimethylolpropane, pentaerythritol, polyether polyols, for example those obtained by condensation of an alkylene oxide or a mixture of alkylene oxides with glycerol, ethylene glycol, trimethylolpropane or pentaerythritol, or polyester polyols, for example those obtained from polycarboxylic acids, in particular oxalic acid, malonic acid, succinic acid, adipic acid, maleic acid, fumaric acid, isophthalic acid or terephthalic acid, with glycerol, ethylene glycol, trimethylolpropane or pentaerythritol.

The polyether polyols obtained by addition of alkylene oxides, in particular ethylene oxide and/or propylene oxide, to aromatic amines, in particular the mixture of 2,4- and 2,6-toluenediamine, are also suitable.

Mention may be made, as other types of polyols, of in particular polythioethers comprising hydroxyl ends, polyamides, polyesteramides, polycarbonates, polyacetals, polyolefins and polysiloxanes.

As regards the polyester and unsaturated polyester resins obtained by reaction of a polyacid with a polyol, mention may be made, for the acid component, of succinic acid, pentanedioic acid, adipic acid, maleic acid, fumaric acid, itaconic acid and anhydrides of these acids, heptanedioic acid, octanedioic acid, azelaic acid, sebacic acid, undecanedioic acid, dodecanedioic acid, brassylic acid, tetradecanedioic acid, hexadecanedioic acid, octadecanedioic acid, octadecenedioic acid, eicosanedioic acid, docosanedioic acid and fatty acid dimers comprising 36 carbons.

The abovementioned fatty acid dimers are dimerized fatty acids obtained by oligomerization or polymerization of unsaturated monobasic fatty acids comprising a long hydrocarbon chain (such as linoleic acid and oleic acid), as described in particular in the document EP 0 471 566.

When the diacid is cycloaliphatic, it can comprise the following carbon-based backbones: norbornylmethane, cyclohexylmethane, dicyclohexylmethane, dicyclohexyl-propane, di(methylcyclohexyl) or di(methylcyclohexyl) propane.

When the diacid is aromatic, it is chosen from phthalic acid, terephthalic acid, isophthalic acid, tetrahydrophthalic acid, trimellitic acid and naphthalenic diacids and anhydrides of these acids.

As regards the polyols, a compound having a molecule comprising at least two hydroxyl groups which make it possible to crosslink the polyacids in order to obtain polyesters, mention may be made of ethylene glycol, propylene glycol, butylene glycol, 1,6-hexamethylene glycol, diethylene glycol, dipropylene glycol, neopentyl glycol, triethylene glycol, glycerol, trimethylolethane, trimethylolpropane, pentaerythritol, 1,3-trimethylene glycol, 1,4-tetramethylene glycol, 1,8-octamethylene glycol, 1,10-decamethylene glycol, 1,4-cyclohexanedimethanol, polyether diols, such as PEG, PPG or PTMG, dicarboxylic acid units, such as terephthalic acid, and glycol (ethanediol) or butanediol units.

It is also possible to obtain polyesteramides when a ternary mixture of HEIO, UDETA and polyol is employed with one of the diacids mentioned.

A better understanding of the invention will be obtained in the light of the following nonlimiting examples.

EXAMPLES

Protocol for the Preparation of the Finished Epoxy Resins for Use in Examples 1 to 4

The epoxy resin formulations according to the invention were obtained in the following way:
  100 g or 25 g of a base epoxy resin are weighed out in a disposable plastic beaker, then
  the necessary amount of curing agent, calculated according to the stoichiometric principle known to a person skilled in the art, that is to say one equivalent of NH per epoxide equivalent, is added. The weight in grams of curing agent to be added is thus equal to (HEW/EGC)×weight of base resin involved, in grams, with HEW (Hydrogen Equivalent Weight, expressed in g/eq) defined by the molar mass of the curing agent in grams divided by the number of active hydrogens, in this case, the number of NH, each NH being capable of reacting with one epoxide group, and EGC (Epoxy Group Content, expressed in millimol of epoxide functional groups per kilogram of base epoxy resin), EGC and HEW being indicated by the suppliers of base resin and curing agent respectively,
the molecule carrying the associative functional group according to the invention is added, simultaneously with the curing agent or via the curing agent after rapid homogenization using a stick, at a content of a few % by weight of the final resin, and
mixing is carried out with a mechanical stirrer for 1 minute.

Example 1

Acceleration of the Setting of an Epoxy Resin According to the Invention preparation of the formulations according to the common protocol described above,
monitoring the temperature as a function of the progression of the exothermic crosslinking using an immersed thermocouple. The desired effect of the addition of a catalyst is to shorten the setting time of a resin/curing agent mixture regarded as too slow. The open time, defined by the time during which it is possible to use and to apply the formulation before the latter becomes too viscous, indeed even solid, generally corresponds, for the liquid system studied, to a doubling of the viscosity. This time is similar to the time necessary for the development of the exothermicity maximum; it is for this reason that the time for reaching the maximum temperature during the crosslinking was compared, for an epoxy resin/curing agent formulation and for the same formulation with the addition of the molecule carrying an associative functional group according to the invention.

Formulation A:
  Base epoxy resin Epikote® 828 EL from Hexion (resin based on bisphenol A): 100 g
  Curing agent Cetepox® 1312 NFH from Aditya Birla Chemicals (mixture of isophoronediamine, CAS No. 2855-13-2 and of benzyl alcohol, this mixture being claimed to be more reactive with regard to epoxy resins than pure isophoronediamine): 62.2 g
Formulation B: Formulation A with in addition 6.5 g of 1-(2-aminoethyl)imidazolidin-2-one CAS No. 6281-42-1, i.e. 4% by weight of the final resin
Formulation C: Formulation A with in addition 11.3 g of 1-(2-aminoethyl)imidazolidin-2-one, i.e. 7% by weight of the final resin
Formulation D:
  Base epoxy resin Epikote® 828 EL: 100 g
  Curing agent Epikure® 943 from Hexion (pure isophoronediamine): 23.2 g
Formulation E: Formulation D with in addition 4.9 g of 1-(2-aminoethyl)imidazolidin-2-one, i.e. 4% by weight of the final resin
Formulation F: Formulation D with in addition 8.6 g of 1-(2-aminoethyl)imidazolidin-2-one, i.e. 6.5% by weight of the final resin Formulation G:

Base epoxy resin Epikote® 240 from Hexion (mixture of epoxy resin based on bisphenol A and of epoxy resin based on bisphenol F, in the presence of a reactive diluent consisting of linear $C_{10}$-$C_{14}$ molecules of monoglycidyl functionality): 100 g Curing agent Cetepox® 1312 NFH: 62.2 g Formulation H: Formulation G with in addition 6.5 g of 1-(2-aminoethyl)imidazolidin-2-one, i.e. 4% by weight of the final resin.

The results of the maximum exothermicity times (in minutes) are collated in the following table 1:

TABLE 1

| Formulation | A | B | C | D | E | F | G | H |
|---|---|---|---|---|---|---|---|---|
| Maximum temperature recorded in ° C. | 106° C. | 106° C. | 133° C. | 133° C. | 169° C. | 172° C. | 66° C. | 104° C. |
| Time at the maximum temperature in minutes | 62' | 40' | 30' | 167' | 117' | 58' | 96' | 34' |

It is seen that the addition of a few percent of 1-(2-aminoethyl)imidazolidin-2-one to the liquid formulations A, D or G makes possible a reduction in the time for reaching the maximum exothermicity which ranges from approximately 35% for formulation A (in comparison with C) up to 65% for D (in comparison with F) and G (in comparison with H), which makes it possible to rely on a shortening of the open time for each formulation in the same proportions. It is noted that the effect of accelerating the crosslinking by the use of 1-(2-aminoethyl)imidazolidin-2-one with a commercial curing agent is greatest for formulations D and G, which are the least reactive of the epoxy systems tested.

Example 2

Acceleration of the Setting of an Epoxy Resin According to the Invention: Comparison with a Tertiary Amine Catalyst The comparison related to the use of the catalyst tetramethylpropylenediamine (TMPDA) CAS No. 110-95-2 which has a molecular weight very close to that of 1-(2-aminoethyl) imidazolidin-2-one (130 g/mol versus 129 g/mol respectively) and which, due to its two tertiary amine functional groups is regarded as a good catalyst for epoxy resins. The TMPDA used is sold by Arkema France under its normal name of tetramethylpropylenediamine.

Formulation G=Formulation G of example 1
Formulation I=Formulation G of example 1 with in addition 4% by weight of TMPDA
Formulation J=Formulation G of example 1 with in addition 4% by weight of 1-(2-aminoethyl)imidazolidin-2-one
Formulation K=Formulation D of example 1
Formulation L=Formulation D of example 1 with in addition 4% by weight of TMPDA
Formulation M=Formulation D of example 1 with in addition 4% by weight of 1-(2-aminoethyl)imidazolidin-2-one, that is to say like formulation E of example 1.

The results of the times in minutes for reaching the exothermicity maximum are given in the following table 2:

TABLE 2

| Formulation | G | I | J | K | L | M |
|---|---|---|---|---|---|---|
| Time at the maximum temperature in minutes | 96' | 60' | 34' | 167' | 140' | 117' |

The use of 1-(2-aminoethyl)imidazolidin-2-one makes it possible to achieve a greater decrease in the setting time of the formulations G and K tested than with the bi-catalyst TMPDA of similar molecular weight.

Example 3

Flexibilization of an Epoxy Resin According to the Invention

The flexibility of a crosslinked resin can be measured in several ways. Its Shore hardness was measured according to the standard NF T 51109.

The Shore hardness measurements were obtained with a needle durometer having the trademark symbol Andilog®. The device is calibrated in order to obtain a hardness of 100 for a hardened steel comprising 0.9% of carbon and of 35 for mild steels. In order to confirm the flexibility of the final resin by use of the molecule carrying an associative functional group according to the invention was retained over time, each resin was maintained at 50° C. for several days and its Shore hardness was regularly measured (standard NF T 51109). According to this test, maintaining at 50° C. for 10 days corresponds approximately to aging for 6 months at ambient temperature.

Formulation A=Formulation A of example 1
Formulation B=Formulation B of example 1
Formulation C=Formulation C of example 1

Results expressed as Shore hardness as a function of time at 50° C., in days. Time zero corresponds to the hardness measurement after reaction between the base resin and the curing agent comprising 1-(2-aminoethyl)imidazolidin-2-one (formulations B and C) or not comprising 1-(2-aminoethyl)imidazolidin-2-one (formulation A), that is to say after complete development of the exotherm caused by the crosslinking and return of the resin to ambient temperature. The measurements given in table 3 are the means of 5 hardness measurements.

TABLE 3

| | Formulation | | |
|---|---|---|---|
| | A | B | C |
| Hardness at time 0 | 23.5 | 14 | 21 |
| Hardness at 3 days at 50° C. | 22.9 | 15.9 | 22.1 |
| Hardness at 4 days at 50° C. | 24.2 | 17 | 20.1 |
| Hardness at 10 days at 50° C. | 26.8 | 18.1 | 23.3 |

The overall decline in the hardness of formulation B in comparison with the reference A in example 3 shows the flexibilizing effect on the final resin of the use of 4% of the molecule carrying the associative functional group according to the invention. This effect persists during the aging test, which consists in maintaining the resin under hot conditions for 10 days.

Example 4

Reinforcement of the Adhesion of an Epoxy Resin

The improvement in the adhesion of a finished epoxy resin to various supports by virtue of the use of a molecule carrying an associative functional group according to the invention was measured according to a "tearing-off" test, standard ISO 2409.

The principle consists in producing a criss-cross pattern on a resin, the crosslinking of which has taken place on different supports, by making parallel and perpendicular incisions in the resin. The criss-cross pattern is composed of 25 squares with dimension of 1 mm by 1 mm and with a thickness of 100 μm. The incisions have to penetrate as far as the support of the paint film. A strip of adhesive tape is placed on the criss-cross pattern produced, which strip is quickly torn off after 5 minutes. The adhesion is then characterized by the number of small squares torn off by the tape. The fewer squares torn off, the better the adhesion is judged to be.

Formulation N:
 Base resin Epikote® 828 EL: 25 g
 Curing agent Ancamine® 2609 (Eurochem Kimya): 10 g.
 Ancamine® 2609 is a mixture of diprimary alkyl- and arylamines, that is to say having two —$NH_2$ functional groups which react with epoxides, catalyzed by a phenol (p-(t-butyl)phenol)
 Formulation O=Formulation N incorporating in addition 1-(2-aminoethyl)imidazolidin-2-one (1.45 g, i.e. 4% by weight of the final resin)
 Formulation P=Formulation N incorporating in addition 2.6 g of 1-(2-aminoethyl)imidazolidin-2-one (7% by weight of the final resin).

The results of the tearing-off test on various supports, as number of squares remaining adhered after tearing off the tape, are collated in the following table 4.

TABLE 4

| | Formulation | | |
|---|---|---|---|
| | N | O | P |
| Number of squares remaining on a ceramic support with a highly impervious surface | 1 | 15 | 18 |
| Number of squares remaining on a polymethyl methacrylate (PMMA) support | 1 | 5 | 15 |
| Number of squares remaining on carbon steel XC18 | 1 | 5 | 10 |

Formulations O and P exhibit a much lower tearing-off than the reference N; the incorporation in the initial formulation of a few percent by weight of 1-(2-aminoethyl)imidazolidin-2-one very markedly improves the adhesion of the finished epoxy resin to ceramic, steel and polymer exhibiting carbonyl groups, such as PMMA.

What is claimed is:
1. A formulation comprising:
 a curing agent; and
 a co-curing agent,
 wherein the curing agent comprises a molecule of formula (I):

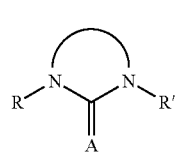

in which:
 R denotes a unit comprising at least one reactive functional group, selected from alcohol, thiol or amine functional group,
 R' denotes a hydrogen atom,
 A denotes an oxygen or sulfur atom,
 wherein the molecule of formula (I) is present in the formulation at a content of 12.7 to 20.9% by weight, with respect to the total weight of the molecule and the co-curing agent.

2. The formulation as claimed in claim 1, wherein R is chosen from $H_2N$—$(CH_2)_n$—, HS—$(CH_2)_n$— or HO—$(CH_2)_n$—, where n represents an integer between 1 and 18.

3. The formulation as claimed in claim 1, wherein said molecule of formula (I) is chosen from: 1-(2-aminoethyl)imidazolidone, 1-(2-hydroxyethypimidazolidone, 1-(2-[(2-aminoethyl)amino]ethyl)imidazolidone, 1-(2-[2-{2-aminoethylamino}ethylamino]ethyl)imidazolidone or N-(6-aminohexyl)-N'-(6-methyl-4-oxo-1,4-dihydropyrimidin-2-yl)urea.

4. The formulation as claimed in claim 1, wherein the co-curing agent is chosen from alkyl- or arylamines and in particular ethylenediamine, diethylenetriamine, triethylenetetramine and tetraethylenepentamine, cyclic diamines, in particular 1-2-diaminocyclohexane, isophoronediamine or N,N'-diisopropylisophoronediamine, aromatic primary diamines, in particular 4,4'-methylenedianiline, 4,4'-methylenebis(ortho-chloroaniline) or xylenediamine isomers, such as diethyltoluenediamine, hydroxyethyldiethylenetriamine, polyetheramines, BADGE-aliphatic amine adducts with an excess of amine functional groups relative to the glycidyls, polyamidoamines, polyamides, amidoamines, polymercaptans, the Mannich bases obtained by reaction between (poly)amine, formaldehyde and (alkyl)phenols, ketimines, dicyanodiamide, polyol epoxy resins and polyurethane-curing polyols.

5. The formulation as claimed in claim 1 further comprising a thermosetting resin, wherein the thermosetting resin is chosen from the group consisting of epoxy resins, polyurethane resins, polyester resins and unsaturated polyester resins.

6. The formulation as claimed in claim 1 further comprising at least two thermosetting resins.

7. The formulation as claimed in claim 6, wherein at least two of the resins are different from each other.

8. The formulation as claimed in claim 2 further comprising a thermosetting resin, wherein n is equal to 1 or 2, and the thermosetting resin is present in water or in an aqueous emulsion.

9. The formulation as claimed in claim 1 further comprising an epoxy resin, wherein the curing agent is 1-(2-aminoethyl)imidazolidin-2-one and the co-curing agent is selected from the group consisting of cyclic diamines, alkylamines and arylamines.

* * * * *